US012541653B2

(12) United States Patent
Ploskon et al.

(10) Patent No.: US 12,541,653 B2
(45) Date of Patent: Feb. 3, 2026

(54) ENTERPRISE COGNITIVE SOLUTIONS LOCK-IN AVOIDANCE

(71) Applicant: International Business Machines Corporation, Armonk, NY (US)

(72) Inventors: Tomasz Ploskon, Cracow (PL); Filis Omer, Constanta (RO); Costel Moraru, Egmating (DE); Laurentiu Gabriel Ghergu, Bucharest (RO); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 17/513,419

(22) Filed: Oct. 28, 2021

(65) Prior Publication Data

US 2023/0138925 A1 May 4, 2023

(51) Int. Cl.
*G06F 40/40* (2020.01)
*G06Q 10/0637* (2023.01)

(52) U.S. Cl.
CPC ....... *G06F 40/40* (2020.01); *G06Q 10/06375* (2013.01)

(58) Field of Classification Search
CPC ... G06Q 10/06375; G06F 40/30; G06F 40/35; G06F 40/40
USPC .......................................................... 704/9
See application file for complete search history.

(56) References Cited

U.S. PATENT DOCUMENTS

| 9,703,617 | B2 | 7/2017 | Allen | |
|---|---|---|---|---|
| 11,144,827 | B1* | 10/2021 | Levy | G06N 3/045 |
| 11,481,559 | B1* | 10/2022 | Asefi | G06F 9/543 |
| 2011/0078105 | A1 | 3/2011 | Wallace | |
| 2013/0085989 | A1* | 4/2013 | Nayyar | G06F 16/119 707/610 |
| 2014/0222422 | A1* | 8/2014 | Sarkaya | G06F 16/3338 704/231 |
| 2016/0342317 | A1* | 11/2016 | Lim | G10L 15/1822 |
| 2019/0205461 | A1* | 7/2019 | Rodgers | G06F 9/541 |
| 2019/0236085 | A1* | 8/2019 | Galitsky | G06F 16/322 |
| 2019/0354358 | A1* | 11/2019 | Nelson | G06F 9/44526 |
| 2020/0082214 | A1* | 3/2020 | Salammagari | G06N 3/006 |
| 2020/0175118 | A1* | 6/2020 | Mahajan | G10L 17/22 |
| 2020/0302936 | A1* | 9/2020 | Abu Asba | G10L 15/30 |
| 2020/0387476 | A1 | 12/2020 | Yap | |
| 2021/0117553 | A1* | 4/2021 | Shpurov | H04L 9/3263 |
| 2021/0192412 | A1* | 6/2021 | Krishnaswamy | G06Q 10/06316 |
| 2021/0209168 | A1* | 7/2021 | Oswald | G06F 40/47 |

(Continued)

OTHER PUBLICATIONS

Anonymous. "Configuring the dialog nodes to enable transfer between chatbots." Jul. 23, 2021. 11 pages. Published by BMC. https://docs.bmc.com/docs/bmcchatbot/configuring-the-dialog-nodes-to-enable-transfer-between-chatbots-904164719.html.

(Continued)

*Primary Examiner* — Richemond Dorvil
*Assistant Examiner* — Rodrigo A Chavez
(74) *Attorney, Agent, or Firm* — David K. Mattheis

(57) ABSTRACT

A processor may analyze a communication associated with a simulation program. The processor may determine whether the simulation program is running. The processor may capture at least one request/response pair in the communication. The processor may store the at least one request/response pair. The processor may train at least one registered natural language processing provider with the request/response pair.

20 Claims, 6 Drawing Sheets

(56) References Cited

U.S. PATENT DOCUMENTS

| | | | | |
|---|---|---|---|---|
| 2021/0240927 A1* | 8/2021 | Zhao | ..................... | G06N 5/025 |
| 2021/0294970 A1* | 9/2021 | Bender | .................. | G06N 5/022 |
| 2023/0138925 A1* | 5/2023 | Ploskon | ........... | G06Q 10/06375 |
| | | | | 704/9 |

OTHER PUBLICATIONS

Anonymous. "How to Store Data for Chatbots." Published Feb. 28, 2021 by the Chatbot Business Framework. 6 pages. https://chatbotbusinessframework.com/how-to-store-data-for-chatbots/.

Anonymous. "Workload Discovery and Recommendations for Cloud Migration with AI." Published Sep. 23, 2020 by IP.com. 11 pages. https://priorart.ip.com/IPCOM/000263649.

Beslic, et al., "Towards a solution avoiding Vendor Lock-in to enable Migration Between Cloud Platforms." In 2nd International Workshop on Model-Driven Engineering for High Performance and Cloud computing (MDHPCL 2013). 10 pages. http://ceur-ws.org/Vol-1118/02-paper.pdf.

Lazzeri, Francesca. "How to Auto-Train Your Machine Learning Model." Published Jun. 24, 2019 by Medium. 9 pages. https://medium.com/microsoftazure/how-to-auto-train-your-machine-learning-model-d10ab806d3fb.

Mell, et al., "The NIST Definition of Cloud Computing," Recommendations of the National Institute of Standards and Technology, U.S. Department of Commerce, Special Publication 800-145, Sep. 2011, 7 pgs.

Opara-Martins, et al., "A Holistic Decision Framework to Avoid Vendor Lock-in for Cloud SaaS Migration." Published Jul. 30, 2017 by Canadian Center of Science and Education. 25 pages. In Computer and Information Science; vol. 10, No. 3; 2017. http://doi.org/10.5539/cis.v10n3p29.

Wikipedia. "Promiscuous mode." Last edited Dec. 30, 2020. 3 pages. Published by Wikipedia. https://en.wikipedia.org/wiki/Promiscuous_mode.

\* cited by examiner

ENTERPRISE COGNITIVE SOLUTIONS LOCK-IN AVOIDANCE

BACKGROUND

The present disclosure relates generally to the field of artificial intelligent (AI)-specific tooling, and more specifically to enterprise cognitive solutions lock-in avoidance.

Unlike conversational (e.g., simulation, conversational simulation, etc.) solutions from a business to consumer (b2c) domain, enterprise conversational agents integrate multiple services under a common solution. For example, a natural language processing solution used in AI assistants is just one of multiple system components and a service used is to translate the natural language into commands that the solution can use in order to execute various actions in an enterprise is another component. Accordingly, with multiple services/components for a solution, there is an inherent drawback in the form of vendor lock-in.

In service mesh-based architecture there is a request routing concept that allows dynamic routing to different versions of a same application based on user identity. In every system there may be activities by prohibited users, especially if the system is publicly accessible. Most of the users of service mesh architecture may be allowed, however, a prohibited user may impact user experience and security of the allowed users by network intrusion, denial-of-service attacks, etc.

SUMMARY

Embodiments of the present disclosure include a method, computer program product, and system for avoiding lock-in in the context of cognitive solutions. A processor may analyze a communication associated with a simulation program. The processor may determine whether the simulation program is running. The processor may capture at least one request/response pair in the communication. The processor may store the at least one request/response pair. The processor may train at least one registered natural language processing provider with the request/response pair.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
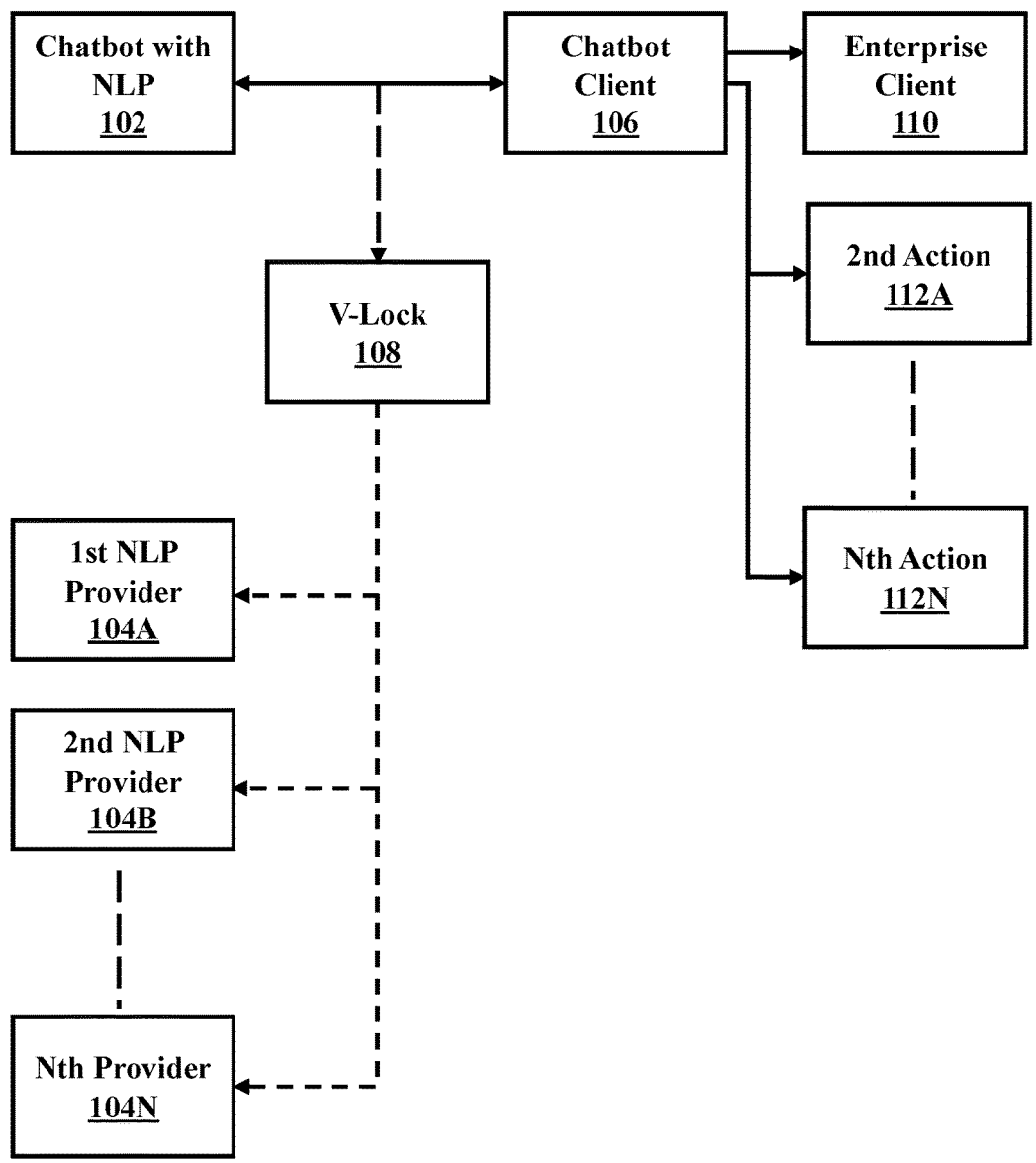
FIG. 1A illustrates a block diagram of an example lock-in avoidance system, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of artificial intelligent (AI)-specific tooling, and more specifically to enterprise cognitive solutions lock-in avoidance. While the present disclosure is not necessarily limited to such applications, various aspects of the disclosure may be appreciated through a discussion of various examples using this context.

Unlike conversational (e.g., simulation, conversational simulation, etc.) solutions from a business to consumer (b2c) domain, enterprise conversational agents (e.g., AI assistants, chatbots, etc.) integrate multiple services under a common solution. For example, a natural language processing solution used in AI assistants is just one of multiple system components and a service used is to translate the natural language into commands that the solution can use in order to execute various actions in an enterprise is another component. A command is a combination of entities plus the intent for any given sentence provided by a user.

For example, if a user says: "Please generate the Saturday employee report for me", a robot (e.g., chatbot) will pass the sentence to a natural language processing (NLP) solution (e.g., AI such as IBM® Watson Assistant) via a REST API and the NLP will return an intent+entities (e.g., intent: SAP_EMPLOYEE_REPORT, Entities: Saturday). Then the robot will have a mapping in a database so that if the intent is "SAP_EMPLOYEE_REPORT", then it should/will execute the report for Saturday (e.g., the entity) on the employees table from an HR database.

As with various cloud platforms, there is the inherent risk in the drawback of vendor lock-in for their NLP services. As a wide majority of enterprises use more than one cloud solution for their business applications, it is important to have a method of easy migration between these vendors.

A second topic to consider is that various cloud platforms charge differently, and the charges are most likely based on a per request basis. Having a method of replicating the natural language processing on a local enterprise environment, would reduce the number of queries done on the remote cloud platform and hence reduce the total cost of ownership for the solution. This also reduces vendor lock-in as the enterprise will have a lower dependency on the remote cloud platform APIs. Accordingly, this disclosure proposes solutions for the problem of vendor lock-in (e.g., sometimes referred to herein as "lock-in") in a conversational (e.g., sometimes referred herein as a "simulation program") agent's domain (e.g., enterprise cognitive solutions).

It is noted that there are currently no known solutions for the problem domain (e.g., conversational agent's domain, enterprise cognitive solutions domain, etc.) in the industry. Traditionally, the conversational agents are built on top of a vendor-specific platform, and the conversational agents evolve without the possibility of migration due to vendor lock-in (e.g., where a user of a product/service becomes dependent on a vendor for the products/services and is unable to use another vendor without substantial switching costs). By reducing the number of calls to a remote cloud API (e.g., for cost reduction), traditional cache solutions can be used, however there is a strong limitation related to the fact that there is no exact key match for input sentences. This makes it difficult for the programmers to use them. Thus, the solution provided herein solves these issues.

The proposed solution is described throughout this specification as "V-Lock". V-Lock is a defensive tool that removes vendor lock-in for simulation programs/conversational agents and ensures an easy and automatic migration between NLP service providers.

It is noted that some aspects of novelty of the proposed solution(s) are that of a sniffer that can analyze application layer data, a persistent storage, a training method for NLP platforms and an adaptive learning facility that can simulate cloud NLP services in an on-premise environment by approximating the cloud NLP services next moves (e.g., what response is likely to be give/generated, etc.). In some embodiments, the training for the NLP platforms is done vial a neural network, which automatically trained. In some embodiments, the solution(s) provided herein can make recommendations between multiple NLP cloud services based on their performance (e.g., one service is likely to provide a better response to a request than another service, etc.).

In some embodiments, the solution(s) is/are reducing the total cost of ownership by reducing the number of calls to a remote cloud NLP service (e.g., by allowing the remote cloud NLP service associate with one client/user to be about to answer previously unanswerable requests, which in turn alleviates the need for multiple requests to be sent/made to the service). In some embodiments, the solution(s) automatically analyze(s) the behavior of a conversational agent (e.g., a first chatbot) and mimics the same behavior with the purpose of replacing the conversational agent with another conversation agent (e.g., a second chatbot); in such an embodiment, the second chatbot is trained to answer requests it previously could not and it allows for the first chatbot to be contacted less because the second chatbot can now adequately respond to requests directed toward the second chatbot.

The major advantages from the novelties discussed above are that a system requires no custom programming in order to achieve the purpose of replacing one conversational agent with another, which in-turn reduces vendor lock-in for cloud NLP services. Further, V-Lock allows an enterprise (e.g., entity, business, user) to choose the best NLP provider for its needs.

Before turning to the FIGS., it is noted that V-Lock is a software solution that has network access, and which can use a network interface in a mode that causes a controller to pass all traffic it receives to a central processing unit (CPU) rather than passing only the frames that the controller is specifically programmed to receive. Such a mode is normally used for packet sniffing that takes place on a router or on a computer connected to a wired network or one being part of a wireless LAN. Interfaces are placed into such a mode by software bridges often used with hardware virtualization. It is noted that in some embodiments V-Lock can also be a hardware appliance, however the preferred approach is as a software solution.

The system (discussed below in regard to FIG. 1A) that includes the V-Lock can capture traffic on the network between an NLP platform and a custom conversational agent code. The V-Lock can conduct an analysis in order to extract ontology, for example, by using metadata in the NLP service response and/or group user provided sentences based on an identified intent (which is explicitly mentioned in the metadata, together with the confidence level of the match). Thus, this means that for a specific conversational log, the V-Lock may be able to build a more exhaustive list of sentences than what was had in an original workspace of a related NLP service (e.g., IBM® Watson Assistant). It is noted that, entities (e.g., what is the object being requested, what action is being requested, etc.) are traditionally highlighted in the metadata of the NLP service response hence V-Lock can also extract the entities in the context of the intent (e.g., what is a client/user asking a conversational agent for [e.g., a report, a picture, destination information, etc.]).

In some embodiments, the solution provided herein may utilize a dialogue tree. In such an embodiment, analysis of the dialog tree can utilize various approaches. For example, a neural network can be used to approximate the next intent in a chain for a given identified intent based on historical data (e.g., captured from the network by the V-Lock). Then, after analysis, the neural network will use the information obtained to replace an NLP service provider in different ways depending on a strategy chosen by an administrator (e.g., user, controller, etc.).

Such strategies may include, but are not limited to:

Training additional NLP providers based on the collected data in order to ensure a migration (e.g., of the collected data, request/response pairs, etc.) in the near future (e.g. within a migration timeframe, such as, when a provider is obligated to provide system within a specific time period). In some embodiments, V-Lock may be able to achieve the integration via direct REST API access of a remote NLP service or via a Robotic Process Automation component which will use the tooling of the NLP to define intents, etc., similar to a human user.

For example, uploading a list of sentences identified for specific intents and entities can be uploaded by a UI Robot that can automatically click/engage buttons in/for a tooling of the remote cloud platform in order to define the configuration. V-Lock can use the approach to train multiple NLP cloud providers then use the feedback from users (e.g., most GUIs allow a: "Did the chatbot solve your problem?" type of question) to select the winning cloud platform (e.g., the cloud platform with the most accurate chatbot after training) for migration; and/or Acting as an "in-house" solution, where the V-Lock can reply to a specific request (e.g., message, query, etc.) from a user similar to a situation when an actual NLP service would be called (e.g., allowing for full in-house automation). This allows the enterprise to reduce the total cost of ownership (e.g., not only monetary, but with computing/processing costs due to less strain caused by contacting a remote service, etc.) with the cloud platform. In an embodiment of this strategy, a wide majority of calls will be served by a local neural network that was trained by the method specified above, and throughout this disclosure, and which can estimate the next most likely reply of the remote NLP service. In this way there is no need for additional calls to the remote service and the cost (e.g., monetary, computing, processing, etc.) is reduced.

An overview of the proposed solution, in system form, can be visualized in the FIG. 1A below. FIG. 1A illustrates a block diagram of an example lock-in avoidance system 100, in accordance with aspects of the present disclosure. As depicted, the lock-in avoidance system 100 includes a chatbot with NLP 102 (an NLP running chatbot), NLP providers 104A-N, a V-Lock 108, a chatbot client 106, an enterprise client 110 (e.g., SLACK®, cloud storage service(s), etc.) and actions 112A-N.

In some embodiments, the chatbot with NLP 102 and the NLP providers 104A-N are considered as public/private cloud chatbot NLP providers. In some embodiments, the V-Lock 108, chatbot client 106, the enterprise client 110, and the actions 112A-N are considered as (a part of) an enterprise domain.

In some embodiments, the chatbot with NLP 102 is in communication with the chatbot client 106, which is in turn in communication with the enterprise client 110. In some embodiments, the chatbot client 106 receives a request (e.g., query, question to be answered, etc.) from the enterprise client 110. The chatbot client 106 may communicate with the chatbot with NLP 102 and receive a response to the request.

In some embodiments, the chatbot client 106 may then provide and/or automatically perform actions 112A-N depending/based on the response. The actions 112A-N may include enterprise solutions such as APIs, Java®, and/or business flows such as IBM® Blueworks, robotic process automation, etc.

In some embodiments, the request and response sent between the chatbot with NLP 102 and the chatbot client 106 may be bundled and paired together as a request/response pair. The request/response pair may be captured by and/or sent to the V-Lock 108. The V-Lock 108 may then use the request/response pair to train the NLP providers 104A-N.

Before turning to further FIGS., it is noted that in some embodiments, the lock-in avoidance system 100 may be installed on a network and may be able to access traffic (e.g., communications) between public/private cloud chatbot NLP providers (e.g., a [remote] cloud platform) and the enterprise client 110 code that is implementing the logic of the chatbot client 106, e.g., a conversational agent.

In some embodiments, various connectors may exist that allow the lock-in avoidance system 100 to tap into specific cloud NLP providers 104A-N (e.g., IBM® Watson Assistant, etc.). In some embodiments, the V-Lock 108 may have access to the network and hence can analyze all meta-data of the response provided by the NLP cloud service (e.g., the chatbot with NLP 102). It is noted that this allows the lock-in avoidance system 100 to extract the intent (e.g., what is being asked in the request, what is being answered in the response, etc.) and entities (e.g., is a user providing the request, where is the response coming from, etc.) identified by the cloud platform as well as additional relevant metadata like the confidence level (e.g., how well does the response answer the request, etc.); all these details can be used in the generation process for training the NLP providers 104A-N, which in turn prevents lock-in now that the trained NLP providers 104A-N can respond to requests that they could previously not respond/understand.

In some embodiments, the V-Lock 108 may use the collected details in two ways depending on its configuration, e.g.:

Train a plurality of other cloud platforms (e.g., NLP providers 104A-N), automatically, by using the collected information (e.g., request/response pair). In such a configuration, the V-Lock 108 can determine, after a period of time, which of the tested cloud NLP services (e.g., NLP providers 104A-N) is performing best by analyzing the confidence levels for the same training sets (e.g., after being trained with the request/response pair, when a new request comes in, does the NLP provider correctly respond); and Attempt to replicate the behavior of the remote NLP in order to reduce the total cost of ownership by reducing the number of calls that a conversational agent/chatbot (e.g., chatbot client 106) is doing on the remote cloud NLP service (e.g. chatbot with NLP 102).

In some embodiments, to determine if the training of the NLP providers 104A-N is over, the V-Lock 108 can run a parallel assessment with an existing NLP platform in order to confirm if the responses provided by the lock-in avoidance system 100 are similar from a confidence level with a real NLP platform (e.g., determine if the trained providers are responding within a threshold range (e.g., 90%, etc.) as the NLP platform where the request/response pair was generated/captured by the V-Lock 108). In some embodiments, if the response is within the confidence level, then the training is over and the V-Lock 108 can be used in production to train more NLP providers 104A-N (which again, in return eliminates lock-in by allowing other NLP providers to now respond to requests that they before could not).

Figure 1B:
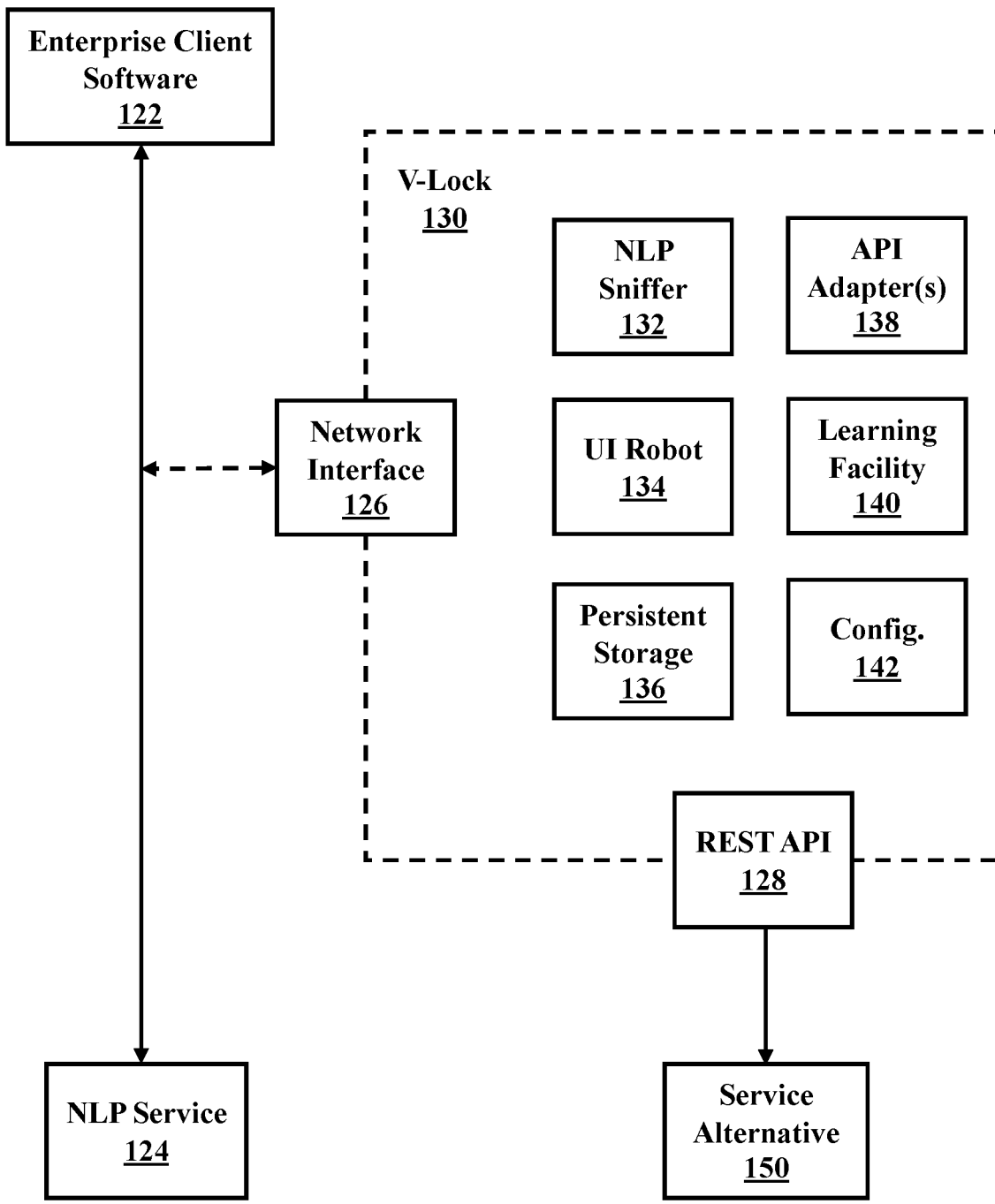
FIG. 1B illustrates a block diagram of an internal enterprise network, in accordance with aspects of the present disclosure.

Referring now to FIG. 1B, illustrated is a block diagram of an internal enterprise network 120, in accordance with aspects of the present disclosure. As depicted, the internal enterprise network 120 includes an enterprise client software 122, an NLP service 124, a V-Lock 130 (which may be the same or substantially similar to the V-Lock 108 in FIG. 1A), and a service alternative 150.

As further depicted, the V-Lock 130 is incorporated with a network interface 126 and a REST API 128. The V-Lock 130 further includes an NLP sniffer 132, a UI Robot 134, a persistent storage 136, API adapter(s) 138, a(n) (adaptive) learning facility 140, and a configuration 142.

In some embodiments, the NLP sniffer 132 is a component that is an advanced sniffing solution that allows the V-Lock 130 to capture the REST API 128 traffic being exchanged on the internal enterprise network 120 between the NLP service 124 and the enterprise client software 122. This allows the internal enterprise network 120 to tap into the communication and obtain additional information from metadata of each request and response between the NLP service 124 and the enterprise client software 122. The information collected is then used for training additional on-line system (NLS) Service alternatives (e.g., service alternative 150). In some embodiments, the information collected may be: a user sentence, intent, entities, context variables, etc. The NLP sniffer 132 can understand the API of the NLP service 124 as it has different adaptors that are vendor specific. This is feasible as the number of main NLP cloud service vendors is limited (e.g., since there is a limited number of providers the adapters are easily identifiable as proprietary).

In some embodiments, the API adapter(s) 138 is/are component(s) that is/are "plug and play," which allows the V-Lock 130 to understand additional REST APIs from other NLP vendors. After specific communication is captured by the NLP sniffer 132, the API adapter(s) 138 may then identify key fields from a JSON as per the API documentation of the NLP service 124. For example, the API adapter(s) 138 may identify that the name of the intent is located in the "Intent" property from the "data" object of a response.

In some embodiments, the (adaptative) learning facility 140 is a component used to approximate a correlation between intents (of requests) by approximating the next intent in a chain based on historical data (e.g., how a response to a request was correctly answered, what question in response to a request was asked next, etc.). In some embodiments, the (adaptative) learning facility 140 can be a neural network that is trained base on data captured from the internal enterprise network 120.

In some embodiments, the (adaptative) learning facility 140 may also be able to extract ontology by capturing a REST API (e.g., the REST API 128) response where it is specified for a specific user sentence what are the identified intents, entities, and context variables (e.g., what is being solved, for who/by who, and why the request was sent, etc.). In some embodiments, all this information will be used during training, either of a local neural network, or of a remote NLP Service provider(s). It is noted that as there is a limited number of relevant NLP service provides, specific adapters and tooling can be developed in various embodiments.

In some embodiments, the UI Robot 134 is a component that may be optional, and the main purpose of the UI Robot 134 may be to execute operations on a user interface of a given cloud NLP service (e.g., 124, or service alternative 150) for which there is no REST API integration available. The number of existing NLP providers that don't offer REST API integration is very limited, however, Robotic Process Automation technology can be used to bypass any kind of limitation and allow full access to training features of these platforms.

In some embodiments, the persistent storage 136 is a component where messages exchanged between the enterprise client software 122 and the NLP service 124 may be persisted for later analysis. The persistence storage 136 can be implemented as a database, a file system, etc. Additionally, besides the messages, the persistent storage 136 may also be used to store any code generated, such as the resulting IBM® Watson Conversation workspaces, etc.

In some embodiments, the configuration 142 is a component that is used by a system administrator via a command line in order to specify various configuration parameters used by the internal enterprise network 120. For example, the administrator may need to configure source IP, or source URL, for the NLP service provider 124 so that the NLP sniffer 132 can correctly capture traffic. Additional configuration parameters are also available, such as, a migration strategy, target similarity level, etc.

In some embodiments, the REST API 128 allows the V-Lock 130 to communicate with the alternative service 150 (e.g., an alternative NLP service provider(s)). In such an embodiment, custom coding is required in order for the V-Lock 130 to communicate with the remote services (e.g., service alternatives 150). Further, authentication and authorization are other concepts that relate to the REST API 128; the details are collected from the configuration 142.

In some embodiments, the NLP service 124 is the main natural language processing service which needs to be replaced, or which needs to be called less, for reducing total cost of ownership. The V-Lock 130 may analyze the behavior of the NLP service 124 and attempt to completely remove it from the communication flow as soon as there is enough data for training of the service alternative 150 (and/or other NLP service providers/alternatives), and mimicked response results of the service alternative 150 are above a response threshold (e.g., the service alternative 150 has correctly responded to mimicked requests 95% of the time, etc.).

In some embodiments, the service alternative 150 is a (remote) NLP service component that represents one or more NLP service providers which will replace the main NLP service (e.g., the NLP service 124) after being trained by the V-Lock 130. In some embodiments, the code for updating/migrating to the service alternative 150 is automatically deployed via the REST API 128 and/or via the UI Robot 134 in case the service alternative 150 requires manual deployment or software artifacts.

In some embodiments, the enterprise client software 122 is a conversational agent within the internal enterprise network 120. In some embodiments, the enterprise client software 122 always uses an advanced custom code that allows proper integration with various enterprise services like SAP®, company databases, etc. In such an embodiment, this allows a conversational system (e.g., a chatbot) to deliver value to its users by allowing training and migration of request/response pairs.

Figure 2:
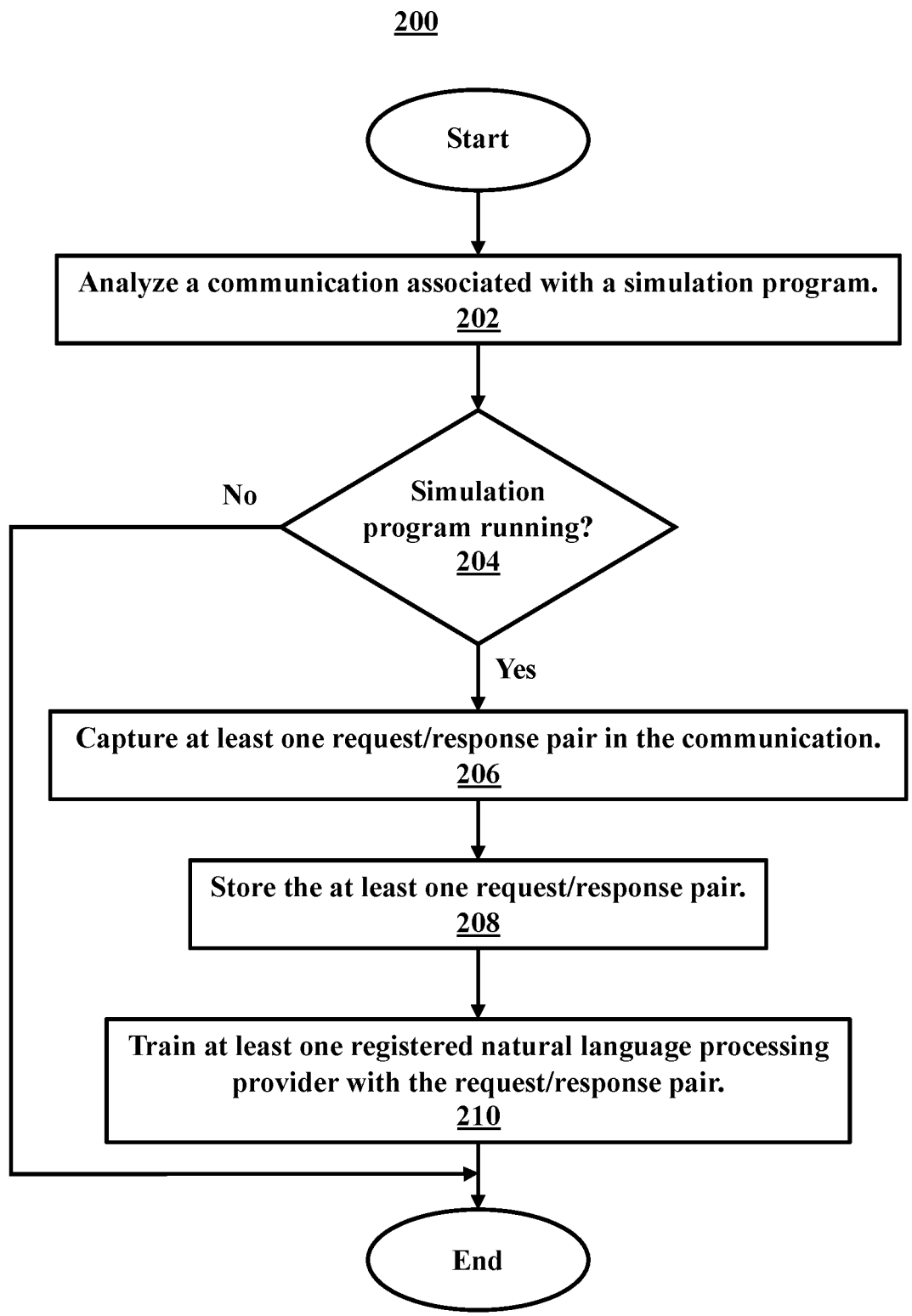
FIG. 2 illustrates a flowchart of an example method for avoiding lock-in in the context of cognitive solutions, in accordance with aspects of the present disclosure.

Referring now to FIG. 2, illustrated a flowchart of an example method 200 for avoiding lock-in in the context of cognitive solutions (e.g., particularly in enterprise/enterprise cognitive solutions), in accordance with aspects of the present disclosure. In some embodiments, the method 200 may be performed by a processor (e.g., of the lock-in avoidance system 100 of FIG. 1A, of the internal enterprise network 120 of FIG. 1B, etc.).

In some embodiments, the method 200 begins at operation 202 where the processor analyzes, a communication associated with a simulation program (e.g., a chatbot, a simulation of a conversation, a conversation simulation, etc.). In some embodiments, the method 200 proceeds to decision block 204 where it is determined whether the simulation program is running (e.g., is a chatbot service/conversational agent/NLP service in current use).

If, at decision block 204 it is determined that the simulation program is not running, the method 200 may end. If, at decision block 204 it is determined that the simulation program is running, the method 200 may proceed to operation 206, where the processor captures at least one request/response pair in the communication.

In some embodiments, the method 200 proceeds to operation 208, where the processor stores the at least one request/response pair (e.g., in persistent storage). In some embodiments, the method 210 proceeds to operation 210, where the processor trains at least one registered natural language (processing) providers (or neural network, or models associated with/used by the NLP providers) with the request/response pair. In some embodiments, after operation 210, the method 200 may end.

In some embodiments, discussed below, there are one or more operations of the method 200 not depicted for the sake of brevity and which are discussed throughout this disclosure. Accordingly, in some embodiments, the processor may further determine if an amount of the at least one request/response pair is above an NLP threshold (e.g., an amount of request/response pairs is above a specific number that allows for training of an NLP service, etc.).

In some embodiments, if the amount of the at least one request/response pair is above the NLP threshold, each of the at least one registered natural language processing providers is trained. If the amount of the at least one request/response pair is not above the NLP threshold, the method 200 may loop back to operation 206 and continue to capture request/response pairs until the NLP threshold is met/exceeded.

In some embodiments, training the at least one registered natural language processing provider is automatic. In some embodiments, the processor may analyze an interaction (e.g., behavior) of an operator to capture the at least one request/response pair (e.g., the conversational agent/user/chatbot may be analyzed/monitored) and the processor may then simulate the interaction (e.g., for a subsequent interaction that is closely related to the analyzed interaction or to be used for training, etc.).

In some embodiments, the communication is application layer data that is analyzed by the processor on an application layer. In some embodiments, the processor may simulate remote cloud natural language processing services of the at least one natural language processing provider in an on-premise environment and predict a future action of the remote cloud natural language processing service (e.g., or provider or from a provider).

In some embodiments, the processor may generate one or more recommendations associated with the remote natural language processing services. The one or more recommendations may be based on the future action (e.g., and/or their performance, either predicted, or occurred/real). The processor may further provide one or more recommendations to the at least one natural language processing provider (or neural network or a user). That is, during training the provider/alternative service replacing an NLP provider/service may be provided with recommended responses for a request and when the recommended responses are accurate within a specified degree (e.g., 80%, or a correct number of responses within a certain timeframe), the provider is considered trained.

In some embodiments, the processor may reduce a total number of requests (or communications) to the remote cloud natural language processing services of the at least one natural language processing services (e.g., cloud NLP service providing a majority of the NLP services for an on-premise NLP service may be reduced by having the on-premise NLP service now being able to provide correct responses for various requests; in such a way, lock-in is mitigated due to the NLP service being able to adapt as a service expands).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
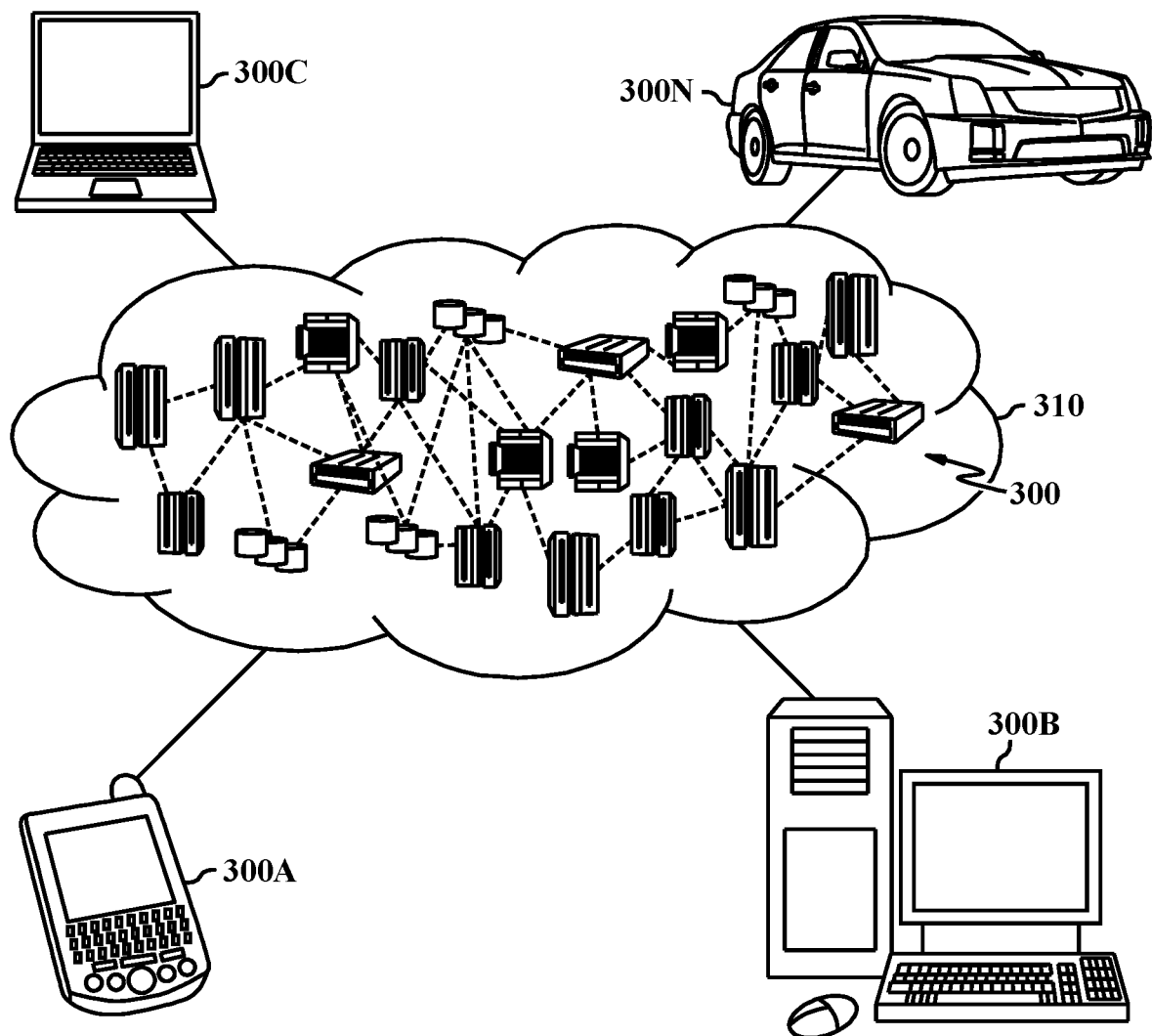
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
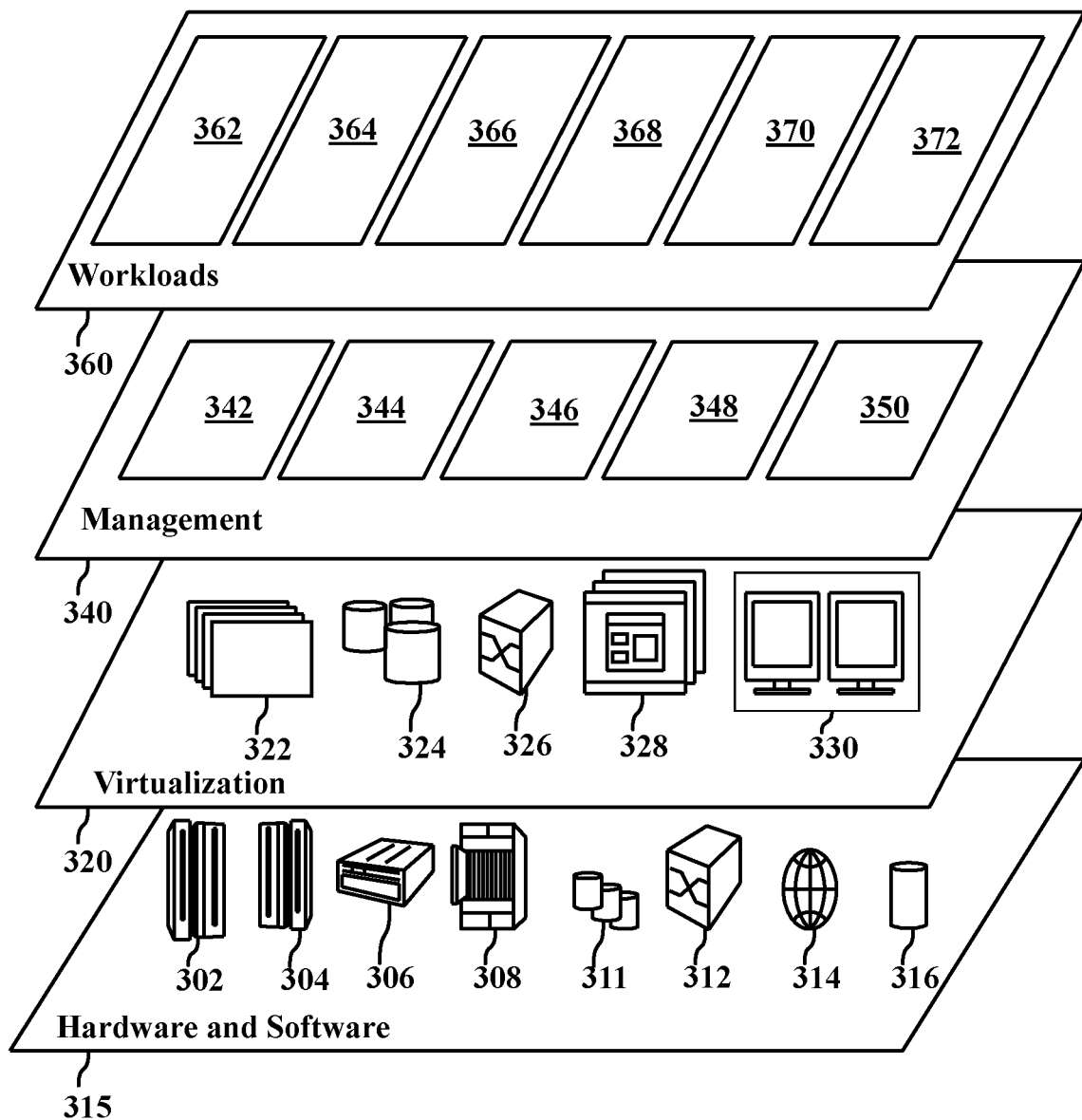
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and avoiding lock-in in the context of cognitive solutions 372.

Figure 4:
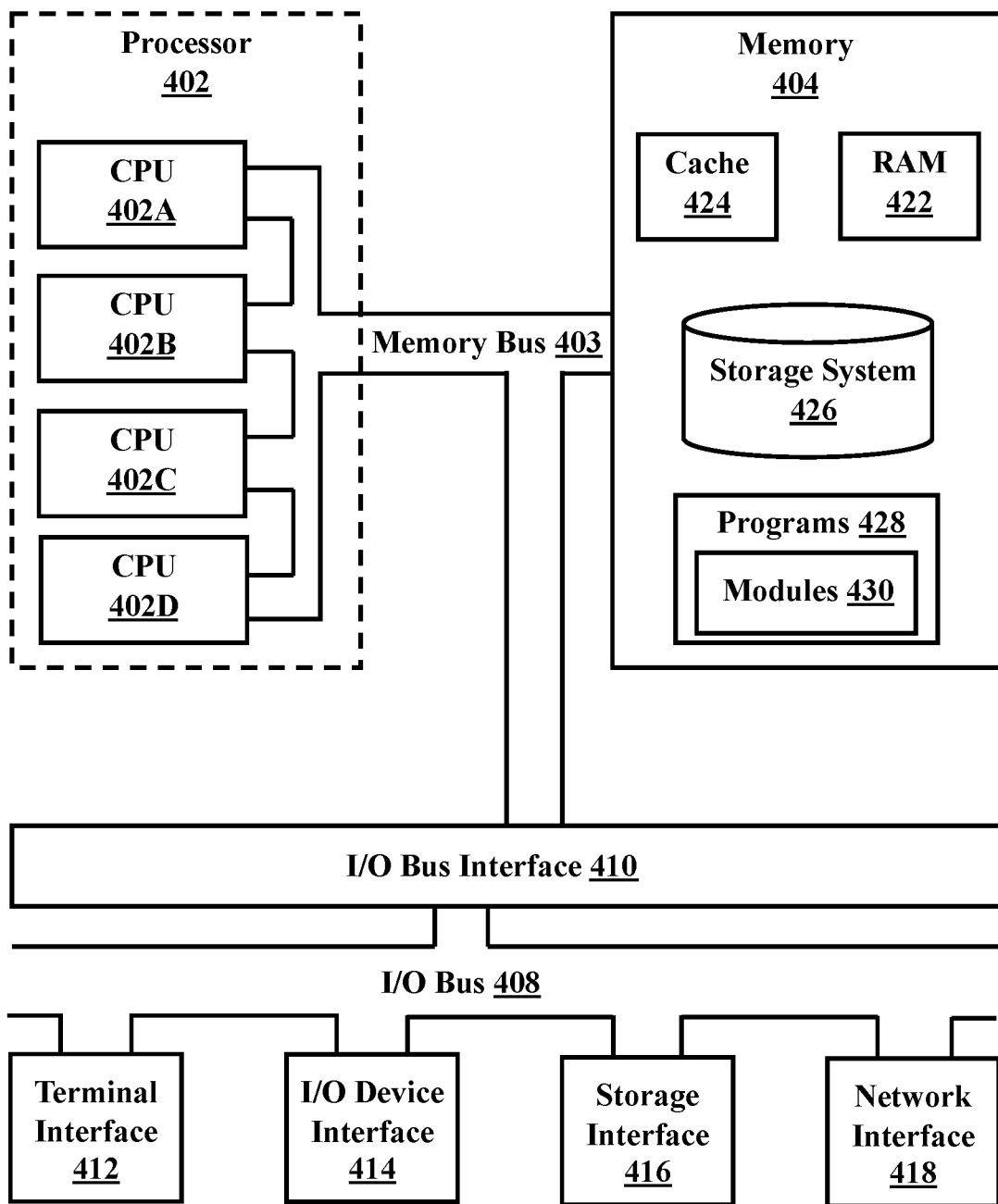
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
   a processor set;
   one or more computer-readable storage media; and
   program instructions stored on the one or more computer-readable storage media to cause the processor set to perform operations comprising:
   analyzing a communication associated with a simulation program;
   determining that the simulation program is running;
   accessing network traffic between a first natural language processing provider and the simulation program using a network connection and an application program interface of the first natural language processing provider;
   capturing, through network traffic analysis at an application layer, at least one request/response pair in the communication from the network traffic;
   extracting metadata associated with the request/response pair from the network traffic wherein the metadata includes an identified intent, intent confidence level, and entities;
   storing the metadata and the at least one request/response pair in a persistent storage;
   training at least one second registered natural language processing provider with the metadata and the request/response pair to replicate behavior of the first natural language processing provider; and
   migrating requests from the first natural language processing provider to the at least one second natural language processing provider after determining the at least one second natural language processing provider responds within a confidence threshold of the first natural language processing provider.

2. The system of claim 1, wherein the processor is further configured to perform operations comprising:
   determining if an amount of the at least one request/response pair is above an NLP threshold.

3. The system of claim 1, wherein training the at least one registered natural language processing provider is automatic.

4. The system of claim 1, wherein the processor is further configured to perform operations comprising:
   analyzing an interaction of an operator to capture the at least one request/response pair; and
   simulating the interaction.

5. The system of claim 1, wherein the communication is analyzed on an application layer, and wherein the system further comprises:
   simulating remote cloud natural language processing services of the at least one natural language processing provider in an on-premise environment; and
   predicting a future action of the remote cloud natural language processing services.

6. The system of claim 5, wherein the processor is further configured to perform operations comprising:
   generating one or more recommendations associated with the remote natural language processing services, wherein the one or more recommendations are based on the future action; and
   providing the one or more recommendations to the at least one natural language processing provider.

7. The system of claim 5, wherein the processor is further configured to perform operations comprising:
   reducing a total number of requests to the remote cloud natural language processing services of the at least one natural language processing services.

8. A method comprising:
   analyzing, by a processor, a communication associated with a simulation program;
   determining that the simulation program is running;
   accessing network traffic between a first natural language processing provider and the simulation program using a network connection and an application program interface of the first natural language processing provider;
   capturing, through network traffic analysis at an application layer, at least one request/response pair in the communication from the network traffic;

extracting metadata associated with the request/response pair from the network traffic wherein the metadata includes an identified intent, intent confidence level, and entities;

storing the metadata and the at least one request/response pair in persistent storage;

training at least one second registered natural language processing provider with the metadata and the request/response pair to replicate behavior of the first natural language processing provider; and migrating requests from the first natural language processing provider to the at least one second natural language processing provider after determining the at least one second natural language processing provider responds within a confidence threshold of the first natural language processing provider.

9. The computer-implemented method of claim 8, further comprising:

determining if an amount of the at least one request/response pair is above an NLP threshold.

10. The computer-implemented method of claim 8, wherein training the at least one registered natural language processing provider is automatic.

11. The computer-implemented method of claim 8, further comprising:

analyzing an interaction of an operator to capture the at least one request/response pair; and simulating the interaction.

12. The computer-implemented method of claim 8, wherein the communication is analyzed on an application layer, and wherein the method further comprises:

simulating remote cloud natural language processing services of the at least one natural language processing provider in an on-premise environment; and predicting a future action of the remote cloud natural language processing services.

13. The computer-implemented method of claim 12, further comprising:

generating one or more recommendations associated with the remote natural language processing services, wherein the one or more recommendations are based on the future action; and providing the one or more recommendations to the at least one natural language processing provider.

14. The computer-implemented method of claim 12, further comprising:

reducing a total number of requests to the remote cloud natural language processing services of the at least one natural language processing services.

15. A computer program product comprising a computer readable storage medium having program instructions embodied therewith, the program instructions executable by a processor to cause the processor to perform operations comprising:

analyzing a communication associated with a simulation program;

determining that the simulation program is running;

accessing network traffic between a first natural language processing provider and the simulation program using a network connection and an application program interface of the first natural language processing provider;

capturing, through network traffic analysis at an application layer, at least one request/response pair in the communication from the network traffic;

extracting metadata associated with the request/response pair from the network traffic wherein the metadata includes an identified intent, intent confidence level, and entities;

storing the metadata and the at least one request/response pair in persistent storage;

training at least one second registered natural language processing provider with the metadata and the request/response pair to replicate behavior of the first natural language processing provider; and migrating requests from the first natural language processing provider to the second natural language processing provider after determining the second natural language processing provider responds within a confidence threshold of the first natural language processing provider.

16. The computer program product of claim 15, wherein the processor is further configured to perform operations comprising:

determining if an amount of the at least one request/response pair is above an NLP threshold.

17. The computer program product of claim 15, wherein training the at least one registered natural language processing provider is automatic.

18. The computer program product of claim 15, wherein the processor is further configured to perform operations comprising:

analyzing an interaction of an operator to capture the at least one request/response pair; and simulating the interaction.

19. The computer program product of claim 15, wherein the communication is analyzed on an application layer, and wherein the processor is further configured to perform operations comprising:

simulating remote cloud natural language processing services of the at least one natural language processing provider in an on-premise environment; and predicting a future action of the remote cloud natural language processing services.

20. The computer program product of claim 19, wherein the processor is further configured to perform operations comprising:

generating one or more recommendations associated with the remote natural language processing services, wherein the one or more recommendations are based on the future action; and providing the one or more recommendations to the at least one natural language processing provider.

* * * * *